(12) United States Patent
Liu et al.

(10) Patent No.: US 12,502,660 B2
(45) Date of Patent: Dec. 23, 2025

(54) CATALYST FOR PYROLYSIS OF 1,2-DICHLOROETHANE (DCE) TO PREPARE VINYL CHLORIDE (VC) AND PREPARATION METHOD, USE, AND REGENERATION METHOD THEREOF

(71) Applicant: DALIAN INSTITUTE OF CHEMICAL PHYSICS, CHINESE ACADEMY OF SCIENCES, Dalian (CN)

(72) Inventors: Guangye Liu, Dalian (CN); Danhua Yuan, Dalian (CN); Yunpeng Xu, Dalian (CN); Zhongmin Liu, Dalian (CN); Yanan Liu, Dalian (CN); Changmin Bai, Dalian (CN); Wei Huang, Dalian (CN); Zhaoan Chen, Dalian (CN); Shiying Li, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 765 days.

(21) Appl. No.: 17/784,648

(22) PCT Filed: Dec. 12, 2019

(86) PCT No.: PCT/CN2019/124872
§ 371 (c)(1),
(2) Date: Jun. 12, 2022

(87) PCT Pub. No.: WO2021/114175
PCT Pub. Date: Jun. 17, 2021

(65) Prior Publication Data
US 2023/0001393 A1    Jan. 5, 2023

(51) Int. Cl.
| | |
|---|---|
| *B01J 29/08* | (2006.01) |
| *B01J 29/18* | (2006.01) |
| *B01J 29/70* | (2006.01) |
| *B01J 29/90* | (2006.01) |
| *B01J 37/08* | (2006.01) |
| *B01J 37/30* | (2006.01) |
| *B01J 38/12* | (2006.01) |
| *C07C 17/25* | (2006.01) |

(52) U.S. Cl.
CPC ........... *B01J 29/082* (2013.01); *B01J 29/084* (2013.01); *B01J 29/18* (2013.01); *B01J 29/7007* (2013.01); *B01J 29/90* (2013.01); *B01J 37/08* (2013.01); *B01J 37/30* (2013.01); *B01J 38/12* (2013.01); *C07C 17/25* (2013.01); *B01J 2229/186* (2013.01)

(58) Field of Classification Search
CPC ........ C07C 17/25; C07C 21/06; B01J 29/082; B01J 29/084; B01J 29/18; B01J 29/7007; B01J 37/30; B01J 37/0009; B01J 2229/18
See application file for complete search history.

(56) References Cited

U.S. PATENT DOCUMENTS

| | | | |
|---|---|---|---|
| 5,008,225 | A | 4/1991 | Magistro |
| 2002/0155051 | A1 | 10/2002 | Kobayashi et al. |

FOREIGN PATENT DOCUMENTS

| | | |
|---|---|---|
| CN | 102247884 A | 11/2011 |
| CN | 102249844 A | 11/2011 |
| CN | 102766018 A | 11/2012 |
| CN | 103894221 A | 7/2014 |
| CN | 106732772 A | 5/2017 |
| EP | 0565789 A1 | 10/1993 |
| JP | S5479209 A | 6/1979 |
| JP | H05132435 A | 5/1993 |
| JP | 2009107969 A | 5/2009 |
| JP | 2012131730 A | 7/2012 |
| KR | 20080021290 A | 3/2008 |
| KR | 20080041401 A | 5/2008 |
| WO | 2013154017 A1 | 10/2013 |

OTHER PUBLICATIONS

ADS,Y-type zeolites (Advance Chemicals Supplier ACS Material, Aug. 19, 2019).*
A. S. Shalygina, et al., Mechanism of 1,2Dichloroethane Dehydrochlorination on the Acid Sites of Oxide Catalysts as Studied by IR Spectroscopy, Kinetics and Catalysis, 2011, pp. 305-315, vol. 52 No. 2.
Shuxing Baia, et al., Dehydrochlorination of 1,2-dichloroethane over Ba modified Al2O3 catalysts, RSC Adv., 2016, pp. 1-42.

* cited by examiner

*Primary Examiner* — Jafar F Parsa
(74) *Attorney, Agent, or Firm* — Bayramoglu Law Offices LLC

(57) ABSTRACT

A catalyst for pyrolysis of 1,2-dichloroethane (1,2-DCE) to prepare vinyl chloride monomer (VCM), a preparation method, a use, and a regeneration method thereof are provided. The catalyst for pyrolysis of 1,2-DCE to prepare VCM includes a silicon-aluminum molecular sieve. The catalyst for pyrolysis of 1,2-DCE to prepare VCM has high reaction activity and excellent selectivity and solves the problem that the pyrolysis of 1,2-DCE to prepare VCM in the prior art involves high reaction temperature and large energy consumption and is prone to coking and carbon deposition.

13 Claims, No Drawings

CATALYST FOR PYROLYSIS OF 1,2-DICHLOROETHANE (DCE) TO PREPARE VINYL CHLORIDE (VC) AND PREPARATION METHOD, USE, AND REGENERATION METHOD THEREOF

CROSS REFERENCE TO THE RELATED APPLICATIONS

This application is the national phase entry of International Application No. PCT/CN2019/124872, filed on Dec. 12, 2019, the entire contents of which are incorporated herein by reference.

TECHNICAL FIELD

The present application relates to a catalyst for pyrolysis of 1,2-dichloroethane (1,2-DCE) to prepare vinyl chloride monomer (VCM) and a preparation method, a use, and a regeneration method thereof, and belongs to the technical field of chemical industry.

BACKGROUND

Polyvinyl chloride (PVC) is the second major general-purpose resin worldwide, and VCM is a main raw material to synthesize PVC. The VCM production is achieved mainly through the following two industrial production routes: calcium carbide route and ethylene route. In the calcium carbide route, VCM is prepared through the hydrochlorination of acetylene under the catalysis of mercury chloride. In the ethylene route, VCM is prepared through the pyrolysis of 1,2-DCE.

The global treaty "Minamata Convention on Mercury" restricts and may eventually prohibit the use of mercury catalysts, making the calcium carbide route the less desirable route for producing VCM in China. Therefore, it is imperative to develop a green VCM production route.

Industrially, thermal pyrolysis is adopted for the pyrolysis of 1,2-DCE to prepare VCM, and a reaction temperature is controlled at about 500° C. to improve a conversion rate of 1,2-DCE. This route involves a high reaction temperature and a large energy consumption and is prone to coking and carbon deposition, which requires periodic shutdown for coke cleaning, causing a great impact on the normal operation of production. Therefore, it is necessary to study and develop a catalyst capable of reducing the pyrolysis temperature and improving the pyrolysis selectivity.

U.S. Pat. No. 5,008,225 discloses a catalyst for catalytic pyrolysis of 1,2-DCE to prepare VCM, where the catalyst is obtained by loading a rare earth element on molecular sieves HFZ-20, HFZ-30, and HFZ-55. When the catalyst is used for catalytic pyrolysis of 1,2-DCE to prepare VCM, a 1,2-DCE conversion rate is 35.8% and a maximum VCM selectivity is 90.1%.

Chinese Patent CN102247884A discloses a catalyst for catalytic pyrolysis of 1,2-DCE to prepare VCM, where the catalyst is obtained by loading a rare earth element on a molecular sieve ZSM-5. When the catalyst is used for catalytic pyrolysis of 1,2-DCE to prepare VCM, a 1,2-DCE conversion rate is 55.6% and a maximum VCM selectivity is 98%.

Chinese Patent CN102249844A discloses a method for catalytic pyrolysis of 1,2-DCE with a metal-modified molecular sieve SAPO-34 as a catalyst to prepare VCM, where a 1,2-DCE conversion rate is 55% and a maximum VCM selectivity is 98%.

Chinese Patent CN102766018A discloses a method for catalytic pyrolysis with a barium chloride catalyst to prepare VCM, where a $BaCl_2$ active component is loaded on activated carbon in a mass fraction of 1% to 30% and is used for catalytic pyrolysis of 1,2-DCE to prepare VCM at 0.1 MPa, 300° C., and a 1,2-DCE vapor space velocity of 240 $h^{-1}$, which has a pyrolysis conversion rate of 38%.

These catalysts can reduce the 1,2-DCE pyrolysis temperature to some extent, but due to insufficient activity, short life, difficult regeneration, and the like, these catalysts still cannot be used in industrial production.

SUMMARY

According to a first aspect of the present application, a catalyst for pyrolysis of 1,2-DCE to prepare VCM is provided, which has high reaction activity and excellent selectivity, and solves the problem that the pyrolysis of 1,2-DCE to prepare VCM in the prior art involves a high reaction temperature and a large energy consumption and is prone to coking and carbon deposition.

A catalyst for pyrolysis of 1,2-DCE to prepare VCM is provided, where the catalyst for pyrolysis of 1,2-DCE to prepare VCM includes a silicon-aluminum molecular sieve.

A catalyst for pyrolysis of 1,2-DCE to prepare VCM is provided, where the catalyst for pyrolysis of 1,2-DCE to prepare VCM is a silicon-aluminum molecular sieve.

Optionally, the silicon-aluminum molecular sieve may have a silicon-aluminum ratio of 2 to 50, and the silicon-aluminum ratio may be based on a molar ratio of $SiO_2$ to $Al_2O_3$.

Specifically, an upper limit of the silicon-aluminum ratio of the silicon-aluminum molecular sieve may be any one of the upper limits independently selected from the group consisting of 2.7, 2.4, 4.8, 9.2, 15.1, 23, and 50; and a lower limit of the silicon-aluminum ratio of the silicon-aluminum molecular sieve may be any one of the upper limits independently selected from the group consisting of 2, 2.7, 2.4, 4.8, 9.2, 15.1, and 23.

Preferably, the silicon-aluminum molecular sieve may have a silicon-aluminum ratio of 2 to 15.1, and the silicon-aluminum ratio may be based on a molar ratio of $SiO_2$ to $Al_2O_3$.

Preferably, the silicon-aluminum molecular sieve may have a silicon-aluminum ratio of 2.7 to 4.8.

Optionally, the silicon-aluminum molecular sieve may include at least one selected from the group consisting of an X-type silicon-aluminum molecular sieve, a Y-type silicon-aluminum molecular sieve, a USY-type silicon-aluminum molecular sieve, an MOR-type silicon-aluminum molecular sieve, and a Beta-type silicon-aluminum molecular sieve.

Preferably, the silicon-aluminum molecular sieve may include at least one selected from the group consisting of an X-type silicon-aluminum molecular sieve, a Y-type silicon-aluminum molecular sieve, a USY-type silicon-aluminum molecular sieve, and an MOR-type silicon-aluminum molecular sieve.

Preferably, the silicon-aluminum molecular sieve may include any one selected from the group consisting of an X-type silicon-aluminum molecular sieve, a Y-type silicon-aluminum molecular sieve, and a USY-type silicon-aluminum molecular sieve.

Preferably, the silicon-aluminum molecular sieve may be an X-type silicon-aluminum molecular sieve or a Y-type silicon-aluminum molecular sieve.

Optionally, the silicon-aluminum molecular sieve may include a hydrogen-type silicon-aluminum molecular sieve.

Optionally, the silicon-aluminum molecular sieve may include a metal ion-modified silicon-aluminum molecular sieve.

Optionally, the metal ion may include at least one selected from the group consisting of an alkali metal ion and an alkaline earth metal ion.

Optionally, the alkali metal ion may include at least one selected from the group consisting of a sodium ion, a potassium ion, and a lithium ion.

Optionally, the alkaline earth metal ion may include at least one selected from the group consisting of a calcium ion, a magnesium ion, a strontium ion, and a barium ion.

Specifically, the silicon-aluminum molecular sieve may include at least one selected from the group consisting of a sodium-type silicon-aluminum molecular sieve, a calcium-type silicon-aluminum molecular sieve, a potassium-type silicon-aluminum molecular sieve, a lithium-type silicon-aluminum molecular sieve, a magnesium-type silicon-aluminum molecular sieve, a strontium-type silicon-aluminum molecular sieve, and a barium-type silicon-aluminum molecular sieve.

Preferably, the silicon-aluminum molecular sieve may include at least one selected from the group consisting of a potassium-type silicon-aluminum molecular sieve, a sodium-type silicon-aluminum molecular sieve, and a barium-type silicon-aluminum molecular sieve.

More preferably, the silicon-aluminum molecular sieve may include a potassium-type silicon-aluminum molecular sieve or a sodium-type silicon-aluminum molecular sieve.

Optionally, the silicon-aluminum molecular sieve may include at least one selected from the group consisting of a lithium-type X silicon-aluminum molecular sieve, a sodium-type X silicon-aluminum molecular sieve, a calcium-type X silicon-aluminum molecular sieve, a sodium-type Y silicon-aluminum molecular sieve, a magnesium-type Y silicon-aluminum molecular sieve, a barium-type Y silicon-aluminum molecular sieve, a potassium-type USY silicon-aluminum molecular sieve, a lithium-type USY silicon-aluminum molecular sieve, a strontium-type USY silicon-aluminum molecular sieve, a sodium-type MOR silicon-aluminum molecular sieve, a potassium-type MOR silicon-aluminum molecular sieve, a hydrogen-type Beta silicon-aluminum molecular sieve, a sodium-type Beta silicon-aluminum molecular sieve, and a potassium-type Beta silicon-aluminum molecular sieve.

Preferably, the silicon-aluminum molecular sieve may include at least one selected from the group consisting of a lithium-type X silicon-aluminum molecular sieve, a sodium-type X silicon-aluminum molecular sieve, a sodium-type Y silicon-aluminum molecular sieve, a magnesium-type Y silicon-aluminum molecular sieve, a barium-type Y silicon-aluminum molecular sieve, a potassium-type USY silicon-aluminum molecular sieve, and a potassium-type MOR silicon-aluminum molecular sieve.

Preferably, the silicon-aluminum molecular sieve may include at least one selected from the group consisting of a lithium-type X silicon-aluminum molecular sieve, a sodium-type X silicon-aluminum molecular sieve, a sodium-type Y silicon-aluminum molecular sieve, a barium-type Y silicon-aluminum molecular sieve, and a potassium-type USY silicon-aluminum molecular sieve.

Preferably, the silicon-aluminum molecular sieve may be a lithium-type X silicon-aluminum molecular sieve or a sodium-type Y silicon-aluminum molecular sieve.

Optionally, a mass content of the silicon-aluminum molecular sieve in the catalyst for pyrolysis of 1,2-DCE to prepare VCM may be 50 wt % to 100 wt %.

The catalyst for pyrolysis of 1,2-DCE to prepare VCM may further include a matrix; and the matrix may include at least one selected from the group consisting of a silica sol, an aluminum sol, an alumina powder, kaolin, and magnesium oxide.

According to a second aspect of the present application, a preparation method of the catalyst for pyrolysis of 1,2-DCE to prepare VCM described above is provided that includes: forming and roasting the silicon-aluminum molecular sieve to obtain the catalyst for pyrolysis of 1,2-DCE to prepare VCM.

Specifically, the preparation method of the catalyst for pyrolysis of 1,2-DCE to prepare VCM may include: directly extruding a silicon-aluminum molecular sieve powder into solid particles, and roasting the solid particles to obtain the catalyst for pyrolysis of 1,2-DCE to prepare VCM.

Optionally, the step of directly extruding a silicon-aluminum molecular sieve powder into solid particles may include: placing the silicon-aluminum molecular sieve powder in a metal mold, and extruding the silicon-aluminum molecular sieve powder into blocky particles.

Optionally, the extrusion may be conducted under a pressure of 15 MPa to 25 MPa.

Preferably, the extrusion may be conducted under a pressure of 20 MPa.

Optionally, the blocky silicon-aluminum molecular sieve particles may be crushed and sieved to obtain 20 to 40 mesh particles.

Optionally, the roasting may be conducted under a roasting temperature of 450° C. to 600° C. and roasting time of 2 h to 4 h.

Specifically, an upper limit of the roasting temperature may be one independently selected from the group consisting of 500° C. and 600° C.; and a lower limit of the roasting temperature may be one independently selected from the group consisting of 450° C. and 500° C.

An upper limit of the roasting time may be one independently selected from the group consisting of 3 h and 4 h; and a lower limit of the roasting time may be one independently selected from the group consisting of 2 h and 3 h.

Optionally, the preparation method of the catalyst for pyrolysis of 1,2-DCE to prepare VCM may include:

a-1) acquiring the hydrogen-type silicon-aluminum molecular sieve and a-2) forming and roasting the hydrogen-type silicon-aluminum molecular sieve to obtain the catalyst for pyrolysis of 1,2-DCE to prepare VCM.

Optionally, the preparation method of the catalyst for pyrolysis of 1,2-DCE to prepare VCM may include:

b-1) acquiring the metal ion-modified silicon-aluminum molecular sieve and b-2) forming and roasting the metal ion-modified silicon-aluminum molecular sieve to obtain the catalyst for pyrolysis of 1,2-DCE to prepare VCM.

Optionally, the preparation method of the catalyst for pyrolysis of 1,2-DCE to prepare VCM may include:

c-1) forming and roasting a mixture of the silicon-aluminum molecular sieve and a matrix to obtain the catalyst for pyrolysis of 1,2-DCE to prepare VCM.

Optionally, before being formed and roasted, the silicon-aluminum molecular sieve may be subjected to ion exchange; and a cation for the ion exchange may be at least one selected from the group consisting of a hydrogen ion, a sodium ion, a calcium ion, a potassium ion, a lithium ion, a magnesium ion, a strontium ion, and a barium ion.

Specifically, a method of the ion exchange can be a method commonly used in the prior art, which is not specifically limited in the present application. A preferred method of the ion exchange is described below:

Hydrogen-type silicon-aluminum molecular sieve: A purchased sodium-type silicon-aluminum molecular sieve is subjected to ion exchange at least once with an ammonium nitrate aqueous solution in a 60° C. water bath, then washed with deionized water, dried, and roasted to obtain a hydrogen-type silicon-aluminum molecular sieve.

Optionally, the ammonium nitrate aqueous solution may have a concentration of 0.5 mol/L to 2 mol/L;

the ion exchange may be conducted 2 to 8 times;
the roasting may be conducted at 500° C. to 600° C.; and
the roasting may be conducted for 3 h to 5 h.

Metal ion-modified silicon-aluminum molecular sieve: A calcium-type silicon-aluminum molecular sieve is taken as an example. A calcium salt is dissolved in deionized water to prepare a corresponding calcium salt aqueous solution. A purchased sodium-type silicon-aluminum molecular sieve is subjected to ion exchange at least once with the calcium salt aqueous solution in a 60° C. water bath, then washed with deionized water, dried, and roasted to obtain a calcium-type silicon-aluminum molecular sieve.

Optionally, the calcium salt may include any one selected from the group consisting of calcium nitrate and calcium chloride;

the calcium salt aqueous solution may have a concentration of 0.5 mol/L to 2 mol/L;
the ion exchange may be conducted 2 to 8 times;
the roasting may be conducted at 500° C. to 600° C.; and
the roasting may be conducted for 3 h to 5 h.

Preparation methods of the potassium-type silicon-aluminum molecular sieve, lithium-type silicon-aluminum molecular sieve, magnesium-type silicon-aluminum molecular sieve, strontium-type silicon-aluminum molecular sieve, and barium-type silicon-aluminum molecular sieve are similar to the preparation method of the calcium-type silicon-aluminum molecular sieve, which will not be repeated here.

Preparation of a catalyst for pyrolysis of 1,2-DCE to prepare VCM which includes a silicon-aluminum molecular sieve and a matrix may be achieved as follows. Taking a purchased sodium-type silicon-aluminum molecular sieve as an example, a specified amount of the matrix and a specified amount of the sodium-type silicon-aluminum molecular sieve powder are thoroughly mixed and subjected to extrusion molding to obtain columnar solid particles. The columnar solid particles are dried and roasted to obtain a matrix-containing sodium-type silicon-aluminum molecular sieve catalyst.

Optionally, the matrix may include at least one selected from the group consisting of a silica sol, an aluminum sol, an alumina powder, kaolin, and magnesium oxide;

the roasting may be conducted at 500° C. to 600° C.; and
the roasting may be conducted for 4 h to 8 h.

Preparation methods of the potassium-type silicon-aluminum molecular sieve/matrix composite, lithium-type silicon-aluminum molecular sieve/matrix composite, magnesium-type silicon-aluminum molecular sieve/matrix composite, strontium-type silicon-aluminum molecular sieve/matrix composite, barium-type silicon-aluminum molecular sieve/matrix composite, and hydrogen-type silicon-aluminum molecular sieve/matrix composite are similar to the above-mentioned preparation method of the sodium-type silicon-aluminum molecular sieve/matrix composite, which will not be repeated here.

According to a third aspect of the present application, a use of the catalyst for pyrolysis of 1,2-DCE to prepare VCM described above in the catalytic pyrolysis of 1,2-DCE to prepare VCM is provided.

According to a fourth aspect of the present application, a method for catalytic pyrolysis of 1,2-DCE to prepare VCM is provided, including: introducing a 1,2-DCE-containing feed gas into a reactor filled with a catalyst, and allowing the 1,2-DCE-containing feed gas to contact the catalyst and be subjected to a reaction to obtain the VCM, where the catalyst is at least one selected from the group consisting of the catalyst for pyrolysis of 1,2-DCE to prepare VCM described above or a catalyst for pyrolysis of 1,2-DCE to prepare VCM prepared by the preparation method described above.

Those skilled in the art can select appropriate operation conditions such as reaction temperature and space velocity according to actual needs.

Optionally, the reaction may be conducted under a reaction temperature of 260° C. to 350° C. and a weight hourly space velocity (WHSV) of the 1,2-DCE of 0.1 $h^{-1}$ to 5 $h^{-1}$.

Specifically, in the VCM preparation process, an upper limit of the reaction temperature may be independently one selected from the group consisting of 270° C., 280° C., 290° C., 300° C., 310° C., 320° C., 330° C., 340° C., and 350° C.; and the lower limit of the reaction temperature may be independently one selected from the group consisting of 260° C., 270° C., 280° C., 290° C., 300° C., 310° C., 320° C., 330° C., and 340° C.

In the VCM preparation process, an upper limit of the WHSV of the 1,2-DCE may be independently one selected from the group consisting of 0.2 $h^{-1}$, 0.4 $h^{-1}$, 0.5 $h^{-1}$, 0.6 $h^{-1}$, 0.8 $h^{-1}$, 1.0 $h^{-1}$, 1.2 $h^{-1}$, 1.5 $h^{-1}$, 1.8 $h^{-1}$, 2.0 $h^{-1}$, 2.5 $h^{-1}$, 3.0 $h^{-1}$, 3.5 $h^{-1}$, 4.0 $h^{-1}$, 4.5 $h^{-1}$, 4.8 $h^{-1}$, and 5.0 $h^{-1}$; and the lower limit of the WHSV of the 1,2-DCE may be independently one selected from the group consisting of 0.1 $h^{-1}$, 0.2 $h^{-1}$, 0.4 $h^{-1}$, 0.5 $h^{-1}$, 0.6 $h^{-1}$, 0.8 $h^{-1}$, 1.0 $h^{-1}$, 1.2 $h^{-1}$, 1.5 $h^{-1}$, 1.8 $h^{-1}$, 2.0 $h^{-1}$, 2.5 $h^{-1}$, 3.0 $h^{-1}$, 3.5 $h^{-1}$, 4.0 $h^{-1}$, 4.5 $h^{-1}$, and 4.8 $h^{-1}$.

Preferably, the reaction may be conducted under a reaction temperature of 300° C. to 350° C. and a WHSV of the 1,2-DCE of 0.1 $h^{-1}$ to 1.0 $h^{-1}$.

More preferably, the reaction may be conducted under a reaction temperature of 300° C. to 350° C. and a WHSV of the 1,2-DCE of 0.5 $h^{-1}$ to 1.0 $h^{-1}$.

Optionally, the reactor may include any one selected from the group consisting of a fixed bed reactor, a fluidized bed reactor, and a moving bed reactor.

Optionally, a conversion rate of the 1,2-DCE may be 70% or higher; and a selectivity for the VCM may be 98% or higher.

Preferably, the conversion rate of the 1,2-DCE may be 90% or higher; and the selectivity for the VCM may be 98% or higher.

More preferably, the conversion rate of the 1,2-DCE may be 95% or higher; and the selectivity for the VCM may be 98% or higher.

According to a fifth aspect of the present application, a regeneration method of a catalyst for pyrolysis of 1,2-DCE to prepare VCM is provided, including: introducing air into a reactor filled with the spent catalyst for pyrolysis of 1,2-DCE to prepare VCM, and subjecting the catalyst for pyrolysis of 1,2-DCE to prepare VCM to regeneration.

Optionally, the regeneration may be conducted under a bed temperature of the catalyst for pyrolysis of 1,2-DCE to prepare VCM in the reactor of 350° C. to 550° C.; a ratio of a flow rate of the air to a volume of the catalyst of 100 h$^{-1}$ to 1,000 h$^{-1}$; and a regeneration time of 2 h to 4 h.

Specifically, an upper limit of the temperature of the bed of the catalyst may be one independently selected from the group consisting of 400° C., 450° C., 500° C., and 550° C.; and a lower limit of the temperature of the bed of the catalyst may be one independently selected from the group consisting of 350° C., 400° C., 450° C., and 500° C.

An upper limit of the ratio of the flow rate of the air to the volume of the catalyst may be one independently selected from the group consisting of 200 h$^{-1}$, 300 h$^{-1}$, 500 h$^{-1}$, 700 h$^{-1}$, 900 h$^{-1}$, and 1,000 h$^{-1}$; and a lower limit of the ratio of the flow rate of the air to the volume of the catalyst may be one independently selected from the group consisting of 100 h$^{-1}$, 200 h$^{-1}$, 300 h$^{-1}$, 500 h$^{-1}$, 700 h$^{-1}$, and 900 h$^{-1}$.

An upper limit of the regeneration time may be one independently selected from the group consisting of 2.5 h, 3 h, 3.5 h, and 4 h; and a lower limit of the regeneration time may be one independently selected from the group consisting of 2 h, 2.5 h, 3 h, and 3.5 h.

Possible beneficial effects of the present application:

1) The catalyst for pyrolysis of 1,2-DCE to prepare VCM provided in the present application has high reaction activity and excellent selectivity with a 1,2-DCE conversion rate up to 95% and a VCM selectivity of 98% or higher.

2) The catalyst for pyrolysis of 1,2-DCE to prepare VCM provided in the present application greatly reduces the 1,2-DCE pyrolysis temperature (which can reduce the temperature of the current industrial thermal pyrolysis of 1,2-DCE to prepare VCM from the range of 450° C. to 500° C. to the range of 260° C. to 350° C.), and alleviates the coking and carbon deposition, thereby reducing the energy consumption.

3) The catalyst for pyrolysis of 1,2-DCE to prepare VCM provided in the present application has the advantages of simple production process, readily-available raw materials, and low cost, and the catalyst can be regenerated after being deactivated, which reduces the production cost.

DETAILED DESCRIPTION OF THE EMBODIMENTS

The present application will be described in detail below with reference to examples, but the present application is not limited to these examples.

Unless otherwise specified, the raw materials in the examples of the present application are all purchased from commercial sources.

Analysis methods in the examples of the present application are as follows:

A gas obtained after a reaction is introduced into an on-line chromatograph through a heated pipeline for on-line analysis. The chromatograph is Agilent7890A and is equipped with a PLOTQ capillary column and a TDX-1 packed column, where an outlet of the PLOTQ capillary column is connected to an FID detector and an outlet of the TDX-1 packed column is connected to a TCD detector.

The conversion rate and selectivity in the examples of the present application are calculated as follows:

In the examples of the present application, the 1,2-DCE conversion rate and VCM selectivity are calculated as follows:

In the examples, the VCM selectivity is calculated based on a carbon mole number of VCM:

VCM selectivity=(carbon mole number of VCM in product)÷[(carbon mole number of 1,2-DCE in feed gas)−(carbon mole number of 1,2-DCE in product)]×(100%)

1,2-DCE conversion rate=[(mole number of 1,2-DCE before reaction)−(mole number of 1,2-DCE after reaction)]÷(mole number of 1,2-DCE before reaction)×(100%).

EXAMPLE 1

200 g of a purchased sodium-type X molecular sieve powder (purchased from Nankai University Catalyst Co., Ltd.) and 400 mL of a 1 mol/L potassium chloride aqueous solution were mixed. The resulting mixture was heated in a 60° C. water bath for 4 h to allow ion exchange. The ion exchange was conducted 2 times, and a resulting product was washed with deionized water, dried, and roasted at 500° C. for 4 h to obtain a potassium-type X molecular sieve.

100 g of the above potassium-type X molecular sieve powder with a silicon-aluminum ratio (SiO$_2$/Al$_2$O$_3$) of 2.7 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished potassium-type X molecular sieve catalyst product with a molecular sieve content of 100%, which was a catalyst for pyrolysis of 1,2-DCE to prepare VCM and was denoted as sample 1#.

The catalyst sample 1# was used in a catalytic pyrolysis reaction of 1,2-DCE. When a WHSV of 1,2-DCE was 1.0 h$^{-1}$ and a reaction temperature was 350° C., a 1,2-DCE conversion rate was 95% and a VCM selectivity was 98.0%.

Regeneration of the catalyst sample 1#: When the 1,2-DCE conversion rate was lower than 50%, air was introduced into a reactor filled with the catalyst to allow regeneration for 2 h, during which a temperature of a catalyst bed was 550° C. and a ratio of a flow rate of the air to a volume of the catalyst was 100 h$^{-1}$.

After the catalyst sample 1# was regenerated, the catalytic pyrolysis reaction of 1,2-DCE was continued according to the conditions in this example, and it was found that the 1,2-DCE conversion rate was recovered from 50% to 95% and the VCM selectivity was recovered from 97% to 98%.

EXAMPLE 2

100 g of a purchased sodium-type X molecular sieve powder with a silicon-aluminum ratio (SiO$_2$/Al$_2$O$_3$) of 2 was weighed, placed in a metal mold, and extruded under an extrusion pressure of 20 Mpa to obtain a blocky material. The blocky material was crushed and sieved to obtain 20 to 40 mesh particles. The particles were roasted at 450° C. for 3 h to obtain a finished sodium-type X molecular sieve catalyst product with a molecular sieve content of 100%, which was a catalyst for pyrolysis of 1,2-DCE to prepare VCM and was denoted as sample 2#.

The catalyst sample 2# was used in a catalytic pyrolysis reaction of 1,2-DCE. When a WHSV of 1,2-DCE was 0.5 h$^{-1}$ and a reaction temperature was 300° C., a 1,2-DCE conversion rate was 92% and a VCM selectivity was 99.0%.

Regeneration of the catalyst sample 2#: When the 1,2-DCE conversion rate was lower than 50%, air was introduced into a reactor filled with the catalyst to allow regeneration for 4 h, during which a temperature of a catalyst bed was 350° C. and a ratio of a flow rate of the air to a volume of the catalyst was 1,000 h$^{-1}$.

After the catalyst sample 2# was regenerated, the catalytic pyrolysis reaction of 1,2-DCE was continued according to the conditions in this example, and it was found that the 1,2-DCE conversion rate was recovered from 50% to 92% and the VCM selectivity was recovered from 98% to 99%.

EXAMPLE 3

200 g of a purchased sodium-type X molecular sieve powder and 400 mL of a 0.5 mol/L calcium chloride aqueous solution were mixed, and the resulting mixture was heated in a 60° C. water bath for 4 h to allow ion exchange. The ion exchange was conducted 4 times. The resulting product was washed with deionized water, dried, and roasted at 550° C. for 5 h to obtain a calcium-type X molecular sieve.

100 g of the above calcium-type X molecular sieve powder with a silicon-aluminum ratio ($SiO_2/Al_2O_3$) of 2.4 was weighed, placed in a metal mold, and extruded under an extrusion pressure of 20 Mpa to obtain a blocky material. The blocky material was crushed and sieved to obtain 20 to 40 mesh particles. The particles were roasted at 600° C. for 3 h to obtain a finished calcium-type X molecular sieve catalyst product with a molecular sieve content of 100%, which was a catalyst for pyrolysis of 1,2-DCE to prepare VCM and was denoted as sample 3#.

The catalyst sample 3# was used in a catalytic pyrolysis reaction of 1,2-DCE, When a WHSV of 1,2-DCE was 5 $h^{-1}$ and a reaction temperature was 260° C., a 1,2-DCE conversion rate was 23% and a VCM selectivity was 98.0%.

Regeneration of the catalyst sample 3#: When the catalyst reacted for 2 h, air was introduced into a reactor filled with the catalyst to allow regeneration for 3 h, during which a temperature of a catalyst bed was 450° C. and a ratio of a flow rate of the air to a volume of the catalyst was 450 $h^{-1}$.

After the catalyst sample 3# was regenerated, the catalytic pyrolysis reaction of 1,2-DCE was continued according to the conditions in this example, and it was found that the 1,2-DCE conversion rate was recovered from 12% to 23% and the VCM selectivity was recovered from 97% to 98%.

EXAMPLE 4

100 g of a purchased sodium-type Y molecular sieve powder with a silicon-aluminum ratio ($SiO_2/Al_2O_3$) of 4.8 (purchased from Nankai University Catalyst Co., Ltd.) was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished sodium-type Y molecular sieve catalyst product with a molecular sieve content of 100%, which was a catalyst for pyrolysis of 1,2-DCE to prepare VCM and was denoted as sample 4#.

The catalyst sample 4# was used in a catalytic pyrolysis reaction of 1,2-DCE. When a WHSV of 1,2-DCE was 0.5 $h^{-1}$ and a reaction temperature was 300° C., a 1,2-DCE conversion rate was 95% and a VCM selectivity was 99.0%.

Regeneration of the catalyst sample 4#: When the 1,2-DCE conversion rate was lower than 50%, air was introduced into a reactor filled with the catalyst to allow regeneration for 3.5 h, during which a temperature of a catalyst bed was 500° C. and a ratio of a flow rate of the air to a volume of the catalyst was 700 $h^{-1}$.

After the catalyst sample 4# was regenerated, the catalytic pyrolysis reaction of 1,2-DCE was continued according to the conditions in this example, and it was found that the 1,2-DCE conversion rate was recovered from 50% to 95% and the VCM selectivity was recovered from 97% to 98%.

EXAMPLE 5

200 g of a purchased sodium-type Y molecular sieve powder and 400 mL of a 2 mol/L magnesium chloride aqueous solution were mixed, and the resulting mixture was heated in a 60° C. water bath for 4 h to allow ion exchange once. The resulting product was washed with deionized water, dried, and roasted at 600° C. for 3 h to obtain a magnesium-type Y molecular sieve.

100 g of the above magnesium-type Y molecular sieve powder with a silicon-aluminum ratio ($SiO_2/Al_2O_3$) of 4.8 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished magnesium-type Y molecular sieve catalyst product with a molecular sieve content of 100%, which was a catalyst for pyrolysis of 1,2-DCE to prepare VCM and was denoted as sample 5#.

The catalyst sample 5# was used in a catalytic pyrolysis reaction of 1,2-DCE. When a WHSV of 1,2-DCE was 1.5 $h^{-1}$ and a reaction temperature was 320° C., a 1,2-DCE conversion rate was 82% and a VCM selectivity was 98.0%.

EXAMPLE 6

200 g of a purchased sodium-type Y molecular sieve powder and 400 mL of a 1 mol/L barium chloride aqueous solution were mixed, and the resulting mixture was heated in a 60° C. water bath for 4 h to allow ion exchange; the ion exchange was conducted 2 times. The resulting product was washed with deionized water, dried, and roasted at 550° C. for 4 h to obtain a barium-type Y molecular sieve.

100 g of the above barium-type Y molecular sieve powder with a silicon-aluminum ratio ($SiO_2/Al_2O_3$) of 4.8 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished barium-type Y molecular sieve catalyst product with a molecular sieve content of 100%, which was a catalyst for pyrolysis of 1,2-DCE to prepare VCM and was denoted as sample 6#.

The catalyst sample 6# was used in a catalytic pyrolysis reaction of 1,2-DCE. When a WHSV of 1,2-DCE was 0.7 $h^{-1}$ and a reaction temperature was 300° C., a 1,2-DCE conversion rate was 92% and a VCM selectivity was 99.0%.

EXAMPLE 7

200 g of a purchased sodium-type USY molecular sieve powder (purchased from Nankai University Catalyst Co., Ltd.) and 400 mL of a 1 mol/L potassium chloride aqueous solution were mixed, and the resulting mixture was heated in a 60° C. water bath for 4 h to allow ion exchange; the ion exchange was conducted 4 times. The resulting product was washed with deionized water, dried, and roasted at 550° C. for 5 h to obtain a potassium-type USY molecular sieve.

100 g of the above potassium-type USY molecular sieve powder with a silicon-aluminum ratio ($SiO_2/Al_2O_3$) of 9.2 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished potassium-type USY molecular sieve catalyst product with a molecular sieve content of 100%, which was a catalyst for pyrolysis of 1,2-DCE to prepare VCM and was denoted as sample 7#.

The catalyst sample 7# was used in a catalytic pyrolysis reaction of 1,2-DCE. When a WHSV of 1,2-DCE was 0.7 $h^{-1}$ and a reaction temperature was 300° C., a 1,2-DCE conversion rate was 93% and a VCM selectivity was 98.0%.

EXAMPLE 8

200 g of a purchased sodium-type USY molecular sieve powder and 400 mL of a 1 mol/L lithium chloride aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a lithium-type USY molecular sieve.

100 g of the above lithium-type USY molecular sieve powder with a silicon-aluminum ratio ($SiO_2/Al_2O_3$) of 9.2 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished lithium-type USY molecular sieve catalyst product with a molecular sieve content of 100%, which was a catalyst for pyrolysis of 1,2-DCE to prepare VCM and was denoted as sample 8#.

The catalyst sample 8# was used in a catalytic pyrolysis reaction of 1,2-DCE. When a WHSV of 1,2-DCE was 3.0 $h^{-1}$ and a reaction temperature was 260° C., a 1,2-DCE conversion rate was 33% and a VCM selectivity was 98.0%.

EXAMPLE 9

200 g of a purchased sodium-type USY molecular sieve powder and 400 mL of a 1 mol/L strontium chloride aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a strontium-type USY molecular sieve.

100 g of the above strontium-type USY molecular sieve powder with a silicon-aluminum ratio ($SiO_2/Al_2O_3$) of 9.2 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished strontium-type USY molecular sieve catalyst product with a molecular sieve content of 100%, which was a catalyst for pyrolysis of 1,2-DCE to prepare VCM and was denoted as sample 9#.

The catalyst sample 9# was used in a catalytic pyrolysis reaction of 1,2-DCE. When a WHSV of 1,2-DCE was 1.0 $h^{-1}$ and a reaction temperature was 280° C., a 1,2-DCE conversion rate was 67% and a VCM selectivity was 98.0%.

EXAMPLE 10

100 g of a purchased sodium-type MOR molecular sieve powder with a silicon-aluminum ratio ($SiO_2/Al_2O_3$) of 15.1 (purchased from Nankai University Catalyst Co., Ltd.) was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished sodium-type MOR molecular sieve catalyst product with a molecular sieve content of 100%, which was a catalyst for pyrolysis of 1,2-DCE to prepare VCM and was denoted as sample 10#.

The catalyst sample 10# was used in a catalytic pyrolysis reaction of 1,2-DCE. When a WHSV of 1,2-DCE was 0.7 $h^{-1}$ and a reaction temperature was 260° C., a 1,2-DCE conversion rate was 51% and a VCM selectivity was 98.0%.

EXAMPLE 11

200 g of a purchased sodium-type MOR molecular sieve powder and 400 mL of a 1 mol/L potassium chloride aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a potassium-type MOR molecular sieve.

100 g of the above potassium-type MOR molecular sieve powder with a silicon-aluminum ratio ($SiO_2/Al_2O_3$) of 15.1 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished potassium-type MOR molecular sieve catalyst product with a molecular sieve content of 100%, which was a catalyst for pyrolysis of 1,2-DCE to prepare VCM and was denoted as sample 11#.

The catalyst sample 11# was used in a catalytic pyrolysis reaction of 1,2-DCE. When a WHSV of 1,2-DCE was 0.7 $h^{-1}$ and a reaction temperature was 350° C., a 1,2-DCE conversion rate was 92% and a VCM selectivity was 99.0%.

EXAMPLE 12

200 g of a purchased sodium-type MOR molecular sieve powder and 400 mL of a 1 mol/L potassium chloride aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a potassium-type MOR molecular sieve.

100 g of the above potassium-type MOR molecular sieve powder with a silicon-aluminum ratio ($SiO_2/Al_2O_3$) of 50 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished potassium-type MOR molecular sieve catalyst product with a molecular sieve content of 100%, which was a catalyst for pyrolysis of 1,2-DCE to prepare VCM and was denoted as sample 12#.

The catalyst sample 12# was used in a catalytic pyrolysis reaction of 1,2-DCE. When a WHSV of 1,2-DCE was 0.1 $h^{-1}$ and a reaction temperature was 280° C., a 1,2-DCE conversion rate was 32% and a VCM selectivity was 98.0%.

EXAMPLE 13

200 g of a purchased sodium-type Beta molecular sieve powder (purchased from Nankai University Catalyst Co., Ltd.) and 400 mL of a 1 mol/L ammonium nitrate aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a hydrogen-type Beta molecular sieve.

100 g of the above hydrogen-type Beta molecular sieve powder with a silicon-aluminum ratio ($SiO_2/Al_2O_3$) of 23 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished hydrogen-type Beta molecular sieve catalyst product with a molecular sieve content of 100%, which was a catalyst for pyrolysis of 1,2-DCE to prepare VCM and was denoted as sample 13#.

The catalyst sample 13# was used in a catalytic pyrolysis reaction of 1,2-DCE. When a WHSV of 1,2-DCE was 0.7 $h^{-1}$ and a reaction temperature was 280° C., a 1,2-DCE conversion rate was 11% and a VCM selectivity was 98.0%.

EXAMPLE 14

100 g of a purchased sodium-type Beta molecular sieve powder with a silicon-aluminum ratio ($SiO_2/Al_2O_3$) of 23 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished sodium-type Beta molecular sieve catalyst product with a molecular sieve content of 100%, which was a catalyst for pyrolysis of 1,2-DCE to prepare VCM and was denoted as sample 14#.

The catalyst sample 14# was used in a catalytic pyrolysis reaction of 1,2-DCE. When a WHSV of 1,2-DCE was 0.1 $h^{-1}$ and a reaction temperature was 350° C., a 1,2-DCE conversion rate was 64% and a VCM selectivity was 98.0%.

EXAMPLE 15

200 g of a purchased sodium-type Beta molecular sieve powder and 400 mL of a 1 mol/L potassium chloride aqueous solution were mixed, and the resulting mixture was heated in a 60° C. water bath for 4 h to allow ion exchange; the ion exchange was conducted 3 times. The resulting product was washed with deionized water, dried, and roasted at 550° C. for 4 h to obtain a potassium-type Beta molecular sieve.

100 g of the above potassium-type Beta molecular sieve powder with a silicon-aluminum ratio ($SiO_2/Al_2O_3$) of 23 was weighed, placed in a metal mold, and extruded under an extrusion pressure of 20 Mpa to obtain a blocky material. The blocky material was crushed and sieved to obtain 20 to 40 mesh particles. The particles were roasted at 500° C. for 3 h to obtain a finished potassium-type Beta molecular sieve catalyst product with a molecular sieve content of 100%, which was a catalyst for pyrolysis of 1,2-DCE to prepare VCM and was denoted as sample 15#.

The catalyst sample 15# was used in a catalytic pyrolysis reaction of 1,2-DCE. When a WHSV of 1,2-DCE was 0.5 $h^{-1}$ and a reaction temperature was 300° C., a 1,2-DCE conversion rate was 28% and a VCM selectivity was 98.0%.

EXAMPLE 16

80 g of a purchased sodium-type MOR molecular sieve powder with a silicon-aluminum ratio ($SiO_2/Al_2O_3$) of 15 was weighed, then 200 g of a silica sol with a silica mass content of 40%, 5 mL of dilute nitric acid with a mass concentration of 5%, and 5 g of lignin were added, and the resulting mixture was thoroughly mixed in a mixer and then extruded by an extruder with a circular orifice plate of 3 mm in diameter to obtain a strip material. The strip material was dried at 60° C. for 6 h and then roasted at 550° C. for 6 h. A roasted strip material was crushed and sieved to obtain cylindrical particles with a length of about 3 mm, which was a finished sodium-type MOR molecular sieve catalyst product with a molecular sieve content of 50% and a silica content of 50% (i.e., a catalyst for pyrolysis of 1,2-DCE to prepare VCM) and was denoted as sample 16#.

The catalyst sample 16# was used in a catalytic pyrolysis reaction of 1,2-DCE. When a WHSV of 1,2-DCE was 0.1 $h^{-1}$ and a reaction temperature was 320° C., a 1,2-DCE conversion rate was 90% and a VCM selectivity was 98.0%.

EXAMPLE 17

80 g of a potassium-type MOR molecular sieve powder with a silicon-aluminum ratio ($SiO_2/Al_2O_3$) of 15.1 was weighed, then 80 g of kaolin, 120 mL of water, 5 mL of dilute nitric acid with a mass concentration of 5%, and 5 g of lignin were added, and the resulting mixture was thoroughly mixed in a mixer and then extruded by an extruder with a circular orifice plate of 3 mm in diameter to obtain a strip material. The strip material was dried at 60° C. for 6 h and then roasted at 550° C. for 6 h. The roasted strip material was crushed and sieved to obtain cylindrical particles with a length of about 3 mm, which was a finished potassium-type MOR molecular sieve catalyst product with a molecular sieve content of 50% and a kaolin content of 50% (i.e., a catalyst for pyrolysis of 1,2-DCE to prepare VCM) and was denoted as sample 17#.

The catalyst sample 17# was used in a catalytic pyrolysis reaction of 1,2-DCE. When a WHSV of 1,2-DCE was 0.1 $h^{-1}$ and a reaction temperature was 320° C., a 1,2-DCE conversion rate was 95% and a VCM selectivity was 98.0%.

The above examples are merely few examples of the present application and do not limit the present application in any form. Although the present application is disclosed as above with preferred examples, the present application is not limited thereto. Some changes or modifications made by any technical personnel with skill in the field using the technical content disclosed above without departing from the scope of the technical solutions of the present application should be considered as equivalent to the implementation cases disclosed above and fall within the scope of the technical solutions.

What is claimed is:
1. A catalyst for a pyrolysis of 1,2-dichloroethane (1,2-DCE) to prepare a vinyl chloride monomer (VCM), wherein the catalyst comprises a silicon-aluminum molecular sieve;
   wherein the silicon-aluminum molecular sieve has a silicon-aluminum ratio of 2 to 9.2,
   the silicon-aluminum ratio is based on a molar ratio of $SiO_2$ to $Al_2O_3$, and
   the catalyst has a VCM selectivity of equal to or higher than 98%;
   wherein the silicon-aluminum molecular sieve comprises at least one selected from the group consisting of an X-type silicon-aluminum molecular sieve, a Y-type silicon-aluminum molecular sieve, a USY-type silicon-aluminum molecular sieve, an MOR-type silicon-aluminum molecular sieve, and a Beta-type silicon-aluminum molecular sieve.
2. The catalyst according to claim 1, wherein the silicon-aluminum molecular sieve comprises a hydrogen-type silicon-aluminum molecular sieve.

3. The catalyst according to claim 1, wherein the silicon-aluminum molecular sieve comprises a metal ion-modified silicon-aluminum molecular sieve.

4. The catalyst according to claim 3, wherein a metal ion in the metal ion-modified silicon-almuminum molecular sieve comprises at least one selected from the group consisting of an alkali metal ion and an alkaline earth metal ion.

5. The catalyst according to claim 4, wherein the alkali metal ion comprises at least one selected from the group consisting of a sodium ion, a potassium ion, and a lithium ion; and the alkaline earth metal ion comprises at least one selected from the group consisting of a calcium ion, a magnesium ion, a strontium ion, and a barium ion.

6. The catalyst according to claim 1, wherein the silicon-aluminum molecular sieve comprises at least one selected from the group consisting of a lithium-type X silicon-aluminum molecular sieve, a sodium-type X silicon-aluminum molecular sieve, a calcium-type X silicon-aluminum molecular sieve, a sodium-type Y silicon-aluminum molecular sieve, a magnesium-type Y silicon-aluminum molecular sieve, a barium-type Y silicon-aluminum molecular sieve, a potassium-type USY silicon-aluminum molecular sieve, a lithium-type USY silicon-aluminum molecular sieve, a strontium-type USY silicon-aluminum molecular sieve, a sodium-type MOR silicon-aluminum molecular sieve, a potassium-type MOR silicon-aluminum molecular sieve, a hydrogen-type Beta silicon-aluminum molecular sieve, a sodium-type Beta silicon-aluminum molecular sieve, and a potassium-type Beta silicon-aluminum molecular sieve.

7. The catalyst according to claim 1, wherein a mass content of the silicon-aluminum molecular sieve in the catalyst is 50 wt % to 100 wt %.

8. The catalyst according to claim 7, further comprising a matrix, wherein
the matrix comprises at least one selected from the group consisting of a silica sol, an aluminum sol, an alumina powder, kaolin, and magnesium oxide.

9. A method for a catalytic pyrolysis of 1,2-DCE to prepare VCM, comprising: introducing a 1,2-DCE-containing feed gas into a reactor filled with a catalyst, and allowing the 1,2-DCE-containing feed gas to contact the catalyst and be subjected to a reaction to obtain the VCM;
wherein the catalyst comprises a silicon-aluminum molecular sieve;
the silicon-aluminum molecular sieve has a silicon-aluminum ratio of 2 to 9.2, the silicon-aluminum ratio is based on a molar ratio of $SiO_2$ to $Al_2O_3$, and the catalyst has a VCM selectivity of equal to or higher than 98%;
the silicon-aluminum molecular sieve comprises at least one selected from the group consisting of an X-type silicon-aluminum molecular sieve, a Y-type silicon-aluminum molecular sieve, a USY-type silicon-aluminum molecular sieve, an MOR-type silicon-aluminum molecular sieve, and a Beta-type silicon-aluminum molecular sieve.

10. The method according to claim 9, wherein the reaction is conducted under a reaction temperature of 260° C. to 350° C. and a weight hourly space velocity (WHSV) of the 1,2-DCE of 0.1 $h^{-1}$ to 5 $h^{-1}$.

11. The method according to claim 9, wherein the reaction is conducted under a reaction temperature of 300° C. to 350° C. and a WHSV of the 1,2-DCE of 0.1 $h^{-1}$ to 1.0 $h^{-1}$.

12. The method according to claim 9, wherein the reactor comprises a fixed bed reactor, a fluidized bed reactor, or a moving bed reactor.

13. The method according to claim 9, wherein a conversion rate of the 1,2-DCE is 90% or higher; and
a selectivity for the VCM is 98% or higher.

* * * * *